United States Patent
Brumberg et al.

(10) Patent No.: US 8,650,856 B2
(45) Date of Patent: Feb. 18, 2014

(54) FLUIDIC DEFLAGRATION-TO-DETONATION INITIATION OBSTACLES

(75) Inventors: Justin Thomas Brumberg, Glenville, NY (US); Adam Rasheed, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 635 days.

(21) Appl. No.: 12/964,968

(22) Filed: Dec. 10, 2010

(65) Prior Publication Data

US 2012/0144798 A1    Jun. 14, 2012

(51) Int. Cl.
*F02K 5/02*    (2006.01)
*F02K 7/00*    (2006.01)

(52) U.S. Cl.
USPC ................ 60/247; 431/1; 60/39.38; 60/39.76

(58) Field of Classification Search
USPC ................. 60/247, 249, 39.38, 39.76; 431/1
See application file for complete search history.

(56) References Cited

U.S. PATENT DOCUMENTS

| | | | |
|---|---|---|---|
| 6,584,765 B1 * | 7/2003 | Tew et al. | 60/249 |
| 6,877,310 B2 | 4/2005 | Leyva | |
| 7,047,724 B2 * | 5/2006 | Nordeen et al. | 60/226.1 |
| 7,367,194 B2 | 5/2008 | Murayama et al. | |
| 7,669,405 B2 | 3/2010 | Pinard et al. | |
| 7,980,056 B2 * | 7/2011 | Rasheed et al. | 60/39.83 |
| 2009/0320439 A1 * | 12/2009 | Chapin et al. | 60/39.38 |
| 2012/0131899 A1 * | 5/2012 | Brumberg et al. | 60/39.76 |
| 2012/0324860 A1 * | 12/2012 | Shimo et al. | 60/39.76 |
| 2013/0025256 A1 * | 1/2013 | Lu et al. | 60/204 |
| 2013/0139487 A1 * | 6/2013 | Kenyon et al. | 60/39.76 |

OTHER PUBLICATIONS

Ephraim Jeff Gutmark, "Duplex Tab Obstacles for Enhancement of Deflagration-to-DetonationTransition", Pending U.S. Appl. No. 12/872,693, filed Aug. 31, 2010; 30 pages.

* cited by examiner

*Primary Examiner* — William H Rodriguez
(74) *Attorney, Agent, or Firm* — Scott J. Asmus

(57) ABSTRACT

A detonation chamber and a pulse detonation combustor including a detonation chamber, wherein the detonation chamber includes a plurality of aerodynamic jets disposed adjacent an exterior of a sidewall of the detonation chamber. The detonation chamber further includes a plurality of openings formed in the sidewall of the detonation chamber, wherein each of the plurality of openings is in fluidic communication with one of the plurality of aerodynamic jets. The plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

27 Claims, 5 Drawing Sheets

FLUIDIC DEFLAGRATION-TO-DETONATION INITIATION OBSTACLES

BACKGROUND

The present disclosure generally relates to cyclic pulsed detonation combustors (PDCs) and more particularly, enhancing the deflagration-to-detonation transition (DDT) process by integrating fluidic initiation obstacles.

In a generalized pulse detonation combustor, fuel and oxidizer (e.g., oxygen-containing gas such as air) are admitted to an elongated detonation chamber at an upstream inlet end. An igniter is used to initiate this combustion process. Following a successful transition to detonation, a detonation wave propagates toward the outlet at supersonic speed causing substantial combustion of the fuel/air mixture before the mixture can be substantially driven from the outlet. The result of the combustion is to rapidly elevate pressure within the combustor before substantial gas can escape through the combustor exit. The effect of this inertial confinement is to produce near constant volume combustion. Such devices can be used to produce pure thrust or can be integrated in a gas-turbine engine. The former is generally termed a pure thrust-producing device and the latter is termed a pulse detonation turbine engine. A pure thrust-producing device is often used in a subsonic or supersonic propulsion vehicle system such as rockets, missiles and afterburner of a turbojet engine. Industrial gas turbines are often used to provide output power to drive an electrical generator or motor. Other types of gas turbines may be used as aircraft engines, on-site and supplemental power generators, and for other applications.

The deflagration-to-detonation (DDT) process begins when a fuel-air mixture in a chamber is ignited via a spark or other ignition source. The subsonic flame generated from the spark accelerates as it travels along the length of the chamber due to various chemical and flow mechanics. As the flame reaches critical speeds, "hot spots" are created that create localized explosions, eventually transitioning the flame to a super sonic detonation wave. The DDT process can take up to several meters of the length of the chamber, and efforts have been made to reduce the distance required for DDT by using internal initiation obstacles in the flow. The problem with obstacles for cyclic detonation devices is that they create a pressure drop within the chamber during the fill process. Initiation obstacles that minimize pressure drops during the fill process are desirable.

As used herein, a "pulse detonation combustor" is understood to mean any device or system that produces pressure rise, temperature rise and velocity increase from a series of repeating detonations or quasi-detonations within the device. A "quasi-detonation" is a supersonic turbulent combustion process that produces pressure rise, temperature rise and velocity increase higher than pressure rise, temperature rise and velocity increase produced by a deflagration wave. Embodiments of pulse detonation combustors include a fuel injection system, an oxidizer flow system, a means of igniting a fuel/oxidizer mixture, and a detonation chamber, in which pressure wave fronts initiated by the ignition process coalesce to produce a detonation wave or quasi-detonation. Each detonation or quasi-detonation is initiated either by external ignition, such as spark discharge or laser pulse, or by gas dynamic processes, such as shock focusing, autoignition or by another detonation (cross-fire). As used herein, a detonation is understood to mean either a detonation or quasi-detonation. The geometry of the detonation combustor is such that the pressure rise of the detonation wave expels combustion products out the pulse detonation combustor exhaust to produce a thrust force. Pulse detonation combustion can be accomplished in a number of types of detonation chambers, including shock tubes, resonating detonation cavities and tubular/tuboannular/annular combustors. As used herein, the term "chamber" includes pipes having circular or non-circular cross-sections with constant or varying cross sectional area. Exemplary chambers include cylindrical tubes, as well as tubes having polygonal cross-sections, for example hexagonal tubes.

BRIEF SUMMARY

Briefly, in accordance with one embodiment, a detonation chamber for a pulse detonation combustor is provided. The detonation chamber includes a plurality of aerodynamic jets disposed adjacent an exterior of a sidewall of the detonation chamber and a plurality of openings formed in the sidewall of the detonation chamber. Each of the plurality of openings is in fluidic communication with one of the plurality of aerodynamic jets. The plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

In accordance with another embodiment, a detonation chamber for a pulse detonation combustor is provided. The detonation chamber includes a plurality of aerodynamic jets disposed adjacent an exterior of a sidewall of the detonation chamber; an inlet and an outlet, wherein the plurality of aerodynamic jets are disposed between the inlet and the outlet; and a plurality of openings formed in the sidewall of the detonation chamber, wherein each of the plurality of openings is in fluidic communication with one of the plurality of aerodynamic jets. The plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

In accordance with another embodiment, a pulse detonation combustor is provided. The pulse detonation combustor includes at least one detonation chamber; an oxidizer supply section for feeding an oxidizer into the detonation chamber; a fuel supply section for feeding a fuel into the detonation chamber; and an igniter for igniting a mixture of the gas and the fuel in the detonation chamber. The detonation chamber further comprises a plurality of aerodynamic jets disposed adjacent an exterior of a sidewall of the detonation chamber and a plurality of openings formed in the sidewall of the detonation chamber, wherein each of the plurality of openings is in fluidic communication with one of the plurality of aerodynamic jets. The plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

These and other advantages and features will be better understood from the following detailed description of preferred embodiments of the invention that is provided in connection with the accompanying drawings.

BRIEF DESCRIPTION OF THE DRAWINGS

The above and other aspects, features, and advantages of the present disclosure will become more apparent in light of the subsequent detailed description when taken in conjunction with the accompanying drawings, wherein like elements are numbered alike in the several FIGs, and in which.

DETAILED DESCRIPTION

Figure 1:
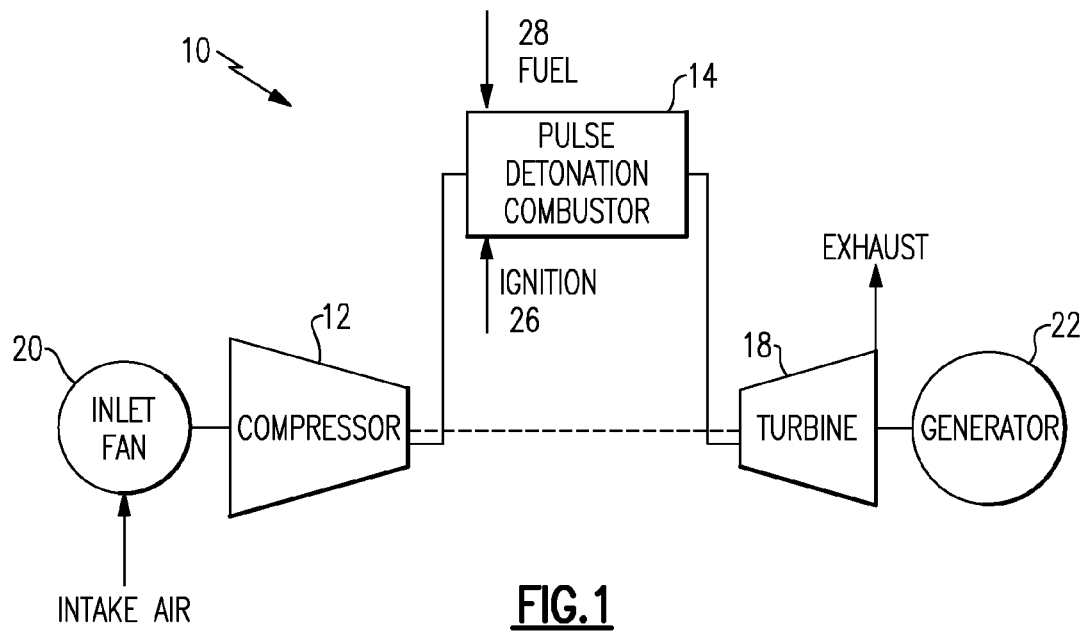
FIG. 1 is a schematic view illustrating a structure of a hybrid pulse detonation turbine engine system.
Figure 2:
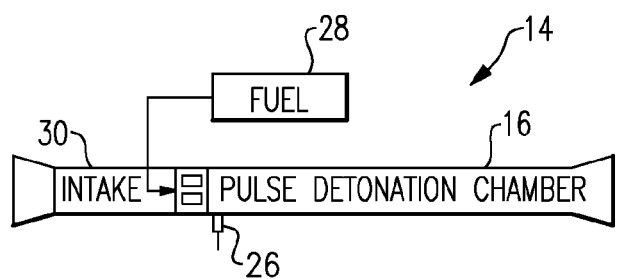
FIG. 2 is a schematic view illustrating a structure of a single detonation chamber of the pulse detonation combustor of FIG. 1.

Referring now to the drawings, one or more specific embodiments of the present disclosure will be described below. In an effort to provide a concise description of these embodiments, not all features of an actual implementation are described in the specification. Illustrated in FIGS. 1 and 2, are various pulse detonation engine systems 10 that convert kinetic and thermal energy of the exhausting combustion products into motive power necessary for propulsion and/or generating electric power. Illustrated in FIG. 1 is an exemplary embodiment of a pulse detonation combustor 14 in a pulse detonation turbine engine concept 10. Illustrated in FIG. 2 is an exemplary embodiment of a pulse detonation combustor 14 in a pure supersonic propulsion vehicle. The pulse detonation combustor 14, shown in FIG. 1 or FIG. 2, includes a detonation chamber 16 having an oxidizer supply section (e.g., an air intake) 30 for feeding an oxidizer (e.g., oxidant such as air) into the detonation chamber 16, a fuel supply section (e.g., a fuel valve) 28 for feeding a fuel into the detonation chamber 16, and an igniter (for instance, a spark plug) 26 by which a mixture of oxidizer combined with the fuel in the detonation chamber 16 is ignited.

In exemplary embodiments, air supplied from an inlet fan 20 and/or a compressor 12, which is driven by a turbine 18, is fed into the detonation chamber 16 through an intake 30. Fresh air is filled in the detonation chamber 16, after purging combustion gases remaining in the detonation chamber 16 due to detonation of the fuel-air mixture from the previous cycle. After the purging the pulse detonation combustor 16, fresh fuel is injected into pulse detonation combustor 16. Next, the igniter 26 ignites the fuel-air mixture forming a flame, which accelerates down the detonation chamber 16, finally transitioning to a detonation wave or a quasi-detonation wave. Due to the detonation combustion heat release, the gases exiting the pulse detonation combustor 14 are at high temperature, high pressure and high velocity conditions, which expand across the turbine 18, located at the downstream of the pulse detonation combustor 16, thus generating positive work. For the pulse detonation turbine engine application with the purpose of generation of power, the pulse detonation driven turbine 18 is mechanically coupled to a generator (e.g., a power generator) 22 for generating power output. For a pulse detonation turbine engine application with the purpose of propulsion (such as the present aircraft engines), the turbine shaft is coupled to the inlet fan 20 and the compressor 12. In a pure pulse detonation engine application of the pulse detonation combustor 14 shown in FIG. 2, which does not contain any rotating parts such as a fan or compressor/turbine/generator, the kinetic energy of the combustion products and the pressure forces acting on the walls of the propulsion system, generate the propulsion force to propel the system.

Figure 3:
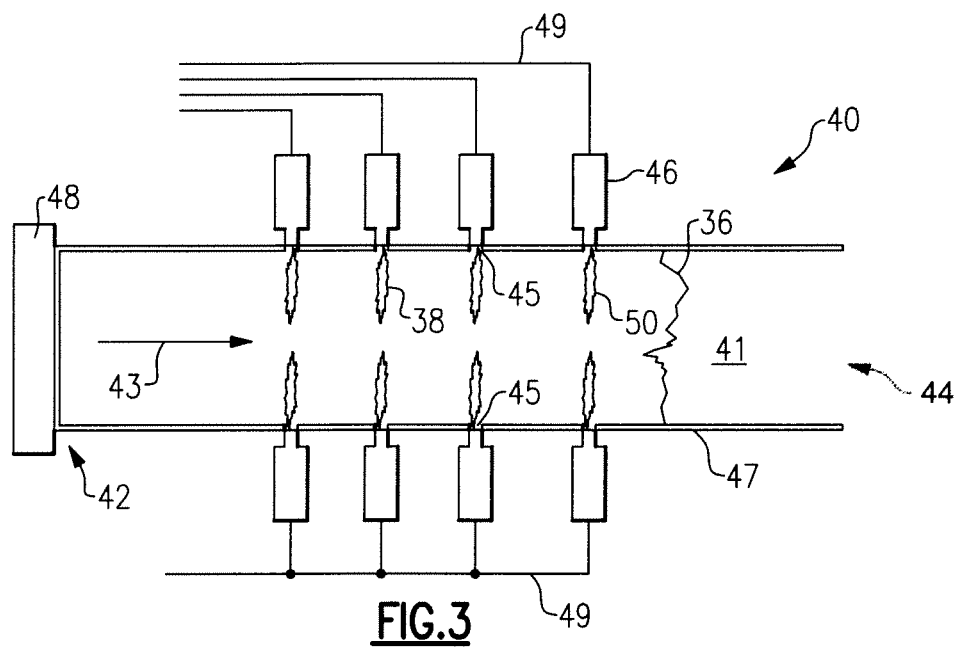
FIG. 3 is a schematic view illustrating an improved pulse detonation combustor including fluidic initiation obstacles for deflagration-to-detonation transition enhancement in accordance with exemplary embodiments.

Turning now to FIGS. 3-10, illustrated are schematic views of alternate embodiments of an improved pulse detonation combustor. The schematic views illustrate an inside of an improved detonation chamber, generally similar to detonation chamber 16 of FIG. 2, by removing the top 50% of the chamber, or tube, surface. More specifically, illustrated in FIG. 3 is an improved pulse detonation combustor, generally depicted as 40, similar to the pulse detonation combustor 14 of FIGS. 1 and 2. The improved pulse detonation combustor 40 is illustrated having a detonation chamber 41 defined by a plurality of sidewalls 47. The improved detonation chamber 41 includes an inlet 42 and an outlet 44, through which a fluid flows from upstream towards downstream, as indicated by the directional arrow 43. The pulse detonation combustion combustor 40 may further include proximate the inlet 42 of the pulse detonation chamber 41, an air intake valve 48.

During operation, detonation initiation requires initiation obstacles to be present in the flow path 43 to efficiently create detonations. In the embodiment depicted in FIG. 3, the improved pulse detonation chamber 41 further includes a plurality of openings 45 in the detonation chamber sidewalls 47, each in fluidic communication with one of a plurality of aerodynamic jets 46. Each of the plurality of aerodynamic jets 46 is configured in fluidic communication with a source of fluid (not shown), such as air, fuel or an air-fuel mix, via a plurality of fluidic connections 49, configured as individually addressable or addressable as a whole. Each of the plurality of aerodynamic jets 46 is configured to provide a jet flow 38 of a fluid into the detonation chamber 41 creating a plurality of initiation obstacles 50. Prior art detonation initiation obstacles, such as ramps, spirals, blockage plates, or shaped walls, are typically fixed and protrude into the detonation chamber 41 resulting in high-pressure drops during the filling of the pulse detonation chamber 41. In contrast, in the exemplary embodiments, the plurality of aerodynamic jets 46 provide the jet flows 38 that act as initiation obstacles during a combustion cycle, yet do not protrude into the detonation chamber 41 during the fill cycle and thus minimize any high-pressure drop. The ability to create a lower pressure drop during the fill cycle will increase the efficiency of the pulse detonation combustor 40.

In the exemplary embodiment of FIG. 3, the plurality of aerodynamic jets 46 are filled externally via fluidic connections 49. During the fill cycle, the plurality of aerodynamic jets 46 are "OFF" so that there is no additional pressure drop within the pulse detonation chamber 41. Prior to ignition, or proximate the time of ignition, the plurality of aerodynamic jets 46 are turned "ON" so that the jet flow 38 of air, fuel, or an air/fuel mix protrudes into the detonation chamber 41 from each of the plurality of aerodynamic jets 46, creating the plurality of initiation obstacles 50. As the detonation passes the plurality of initiation obstacles 50, the turbulence created causes flame stretching to help accelerate a flame 36. The plurality of aerodynamic jets 46 can be turned "ON" simultaneously or sequentially to be timed with the passing of the flame front.

Figure 4:
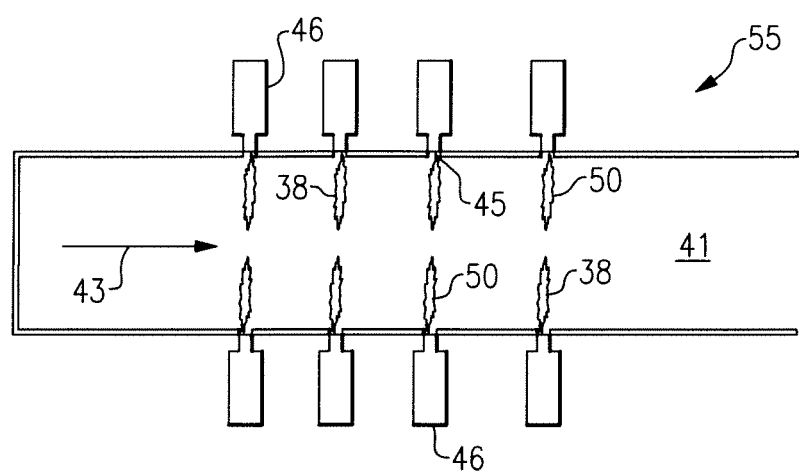
FIG. 4 is a schematic view illustrating an improved pulse detonation combustor including fluidic initiation obstacles for deflagration-to-detonation transition enhancement in accordance with exemplary embodiments.

Referring now to FIG. 4, illustrated is an improved pulse detonation combustor, generally depicted as 55, similar to the pulse detonation combustor 14 of FIGS. 1 and 2. For ease of illustration, the same numerals may be used to indicate similar elements in the figures. In contrast to the embodiment described with reference to FIG. 3, the improved pulse detonation combustor 55 provides the plurality of aerodynamic jets 46 wherein each is configured in fluidic communication with the detonation chamber 41 and is capable of drawing in a portion of the fluid 43 present within the combustion detonation chamber 41. Upon ignition, the plurality of aerodynamic jets 46 direct the fluid 43 drawn into each of the jets 46, back into the detonation chamber 41 via openings 45 as the jet flows 38, creating the plurality of initiation obstacle 50. In the exemplary embodiment illustrated in FIG. 4, an external air, fuel or air/fuel mix is not required to generate the plurality of initiation obstacles 50.

Figure 5:
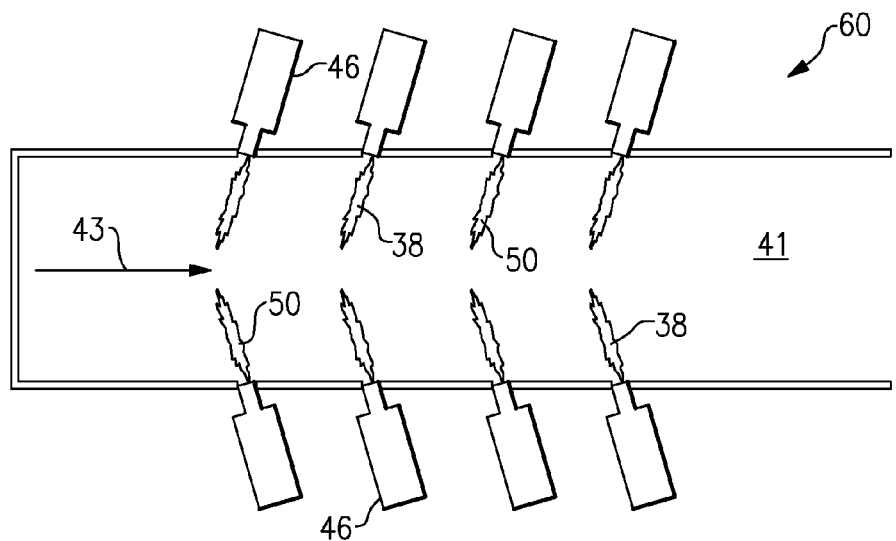
FIG. 5 is a schematic view illustrating an improved pulse detonation combustor including fluidic initiation obstacles for deflagration-to-detonation transition enhancement in accordance with exemplary embodiments.
Figure 6:
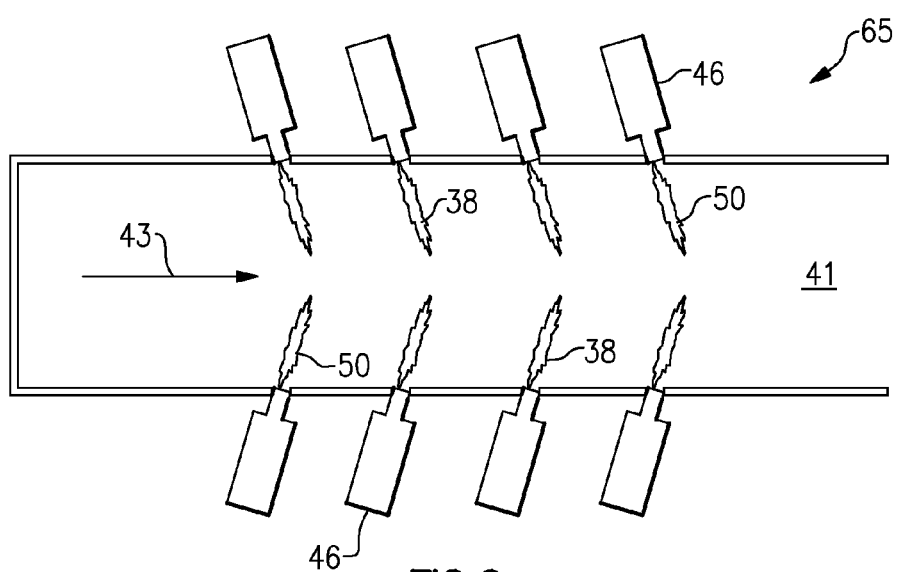
FIG. 6 is a schematic view illustrating an improved pulse detonation combustor including fluidic initiation obstacles for deflagration-to-detonation transition enhancement in accordance with exemplary embodiments.
Figure 7:
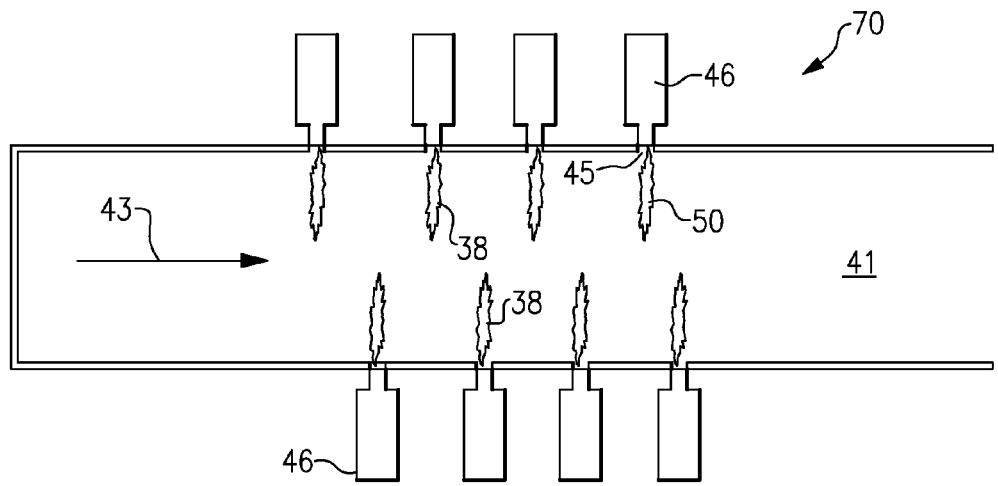
FIG. 7 is a schematic view illustrating an improved pulse detonation combustor including fluidic initiation obstacles for deflagration-to-detonation transition enhancement in accordance with exemplary embodiments.

Referring now to FIGS. 5-7, the plurality of aerodynamic jets 46 and their jet flows 38, such as those previously described in FIGS. 3 and 4, and the resulting initiation obstacles 50 may be configured relative to the detonation chamber 41, in a counterflow configuration to the fluid flow 43, or angled upstream, as best illustrated in FIG. 5 in an improved pulse detonation combustor, generally depicted as 60. Alternatively, the plurality of aerodynamic jets 46 and their jet flows 38, and the resulting initiation obstacles 50 may be configured relative to the detonation chamber 41, in a flow configuration with the fluid flow 43, or angled downstream, as best illustrated in FIG. 6 in an improved pulse detonation combustor, generally depicted as 65. It is additionally anticipated that the plurality of aerodynamic jets 46 and their jet flows 38, and the resulting initiation obstacles 50 may be configured in alignment cross-stream, as best illustrated in FIGS. 3 and 4, or in an offset cross-stream alignment, as best illustrated in FIG. 7 in an improved pulse detonation combustor, generally depicted as 70. It is further anticipated that the plurality of aerodynamic jets 46 and their jet flows 38, and the resulting initiation obstacles 50 may be configured in any other configuration that provides for the most effective results, such as a combination of the above (i.e. angled downstream in an offset cross-stream alignment).

Figure 8:
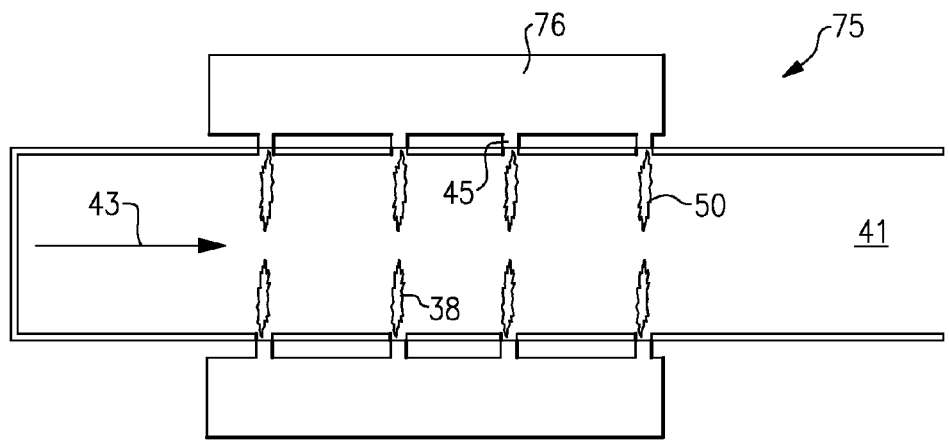
FIG. 8 is a schematic view illustrating an improved pulse detonation combustor including fluidic initiation obstacles for deflagration-to-detonation transition enhancement in accordance with exemplary embodiments.

FIG. 8 illustrates an alternate embodiment of an improved pulse detonation combustor, generally depicted as 75, similar to the pulse detonation combustor 14 of FIGS. 1 and 2. In contrast to the previous embodiments, the improved pulse detonation combustor 75 includes a pulse detonation actuator (PDA) 76. The pulse detonation actuator 76 is disposed adjacent the detonation chamber sidewall 47 and adapted for impulsively detonating a flow of fuel, air or fuel/air mixture to produce the jet flows 38. The detonation chamber sidewall 47 includes the openings 45 adapted for communicating combustion product flows from the pulse detonation actuator 76 to the detonation chamber 41 as the jet flows 38, and thereby creating the plurality of initiation obstacles 50.

Figure 9:
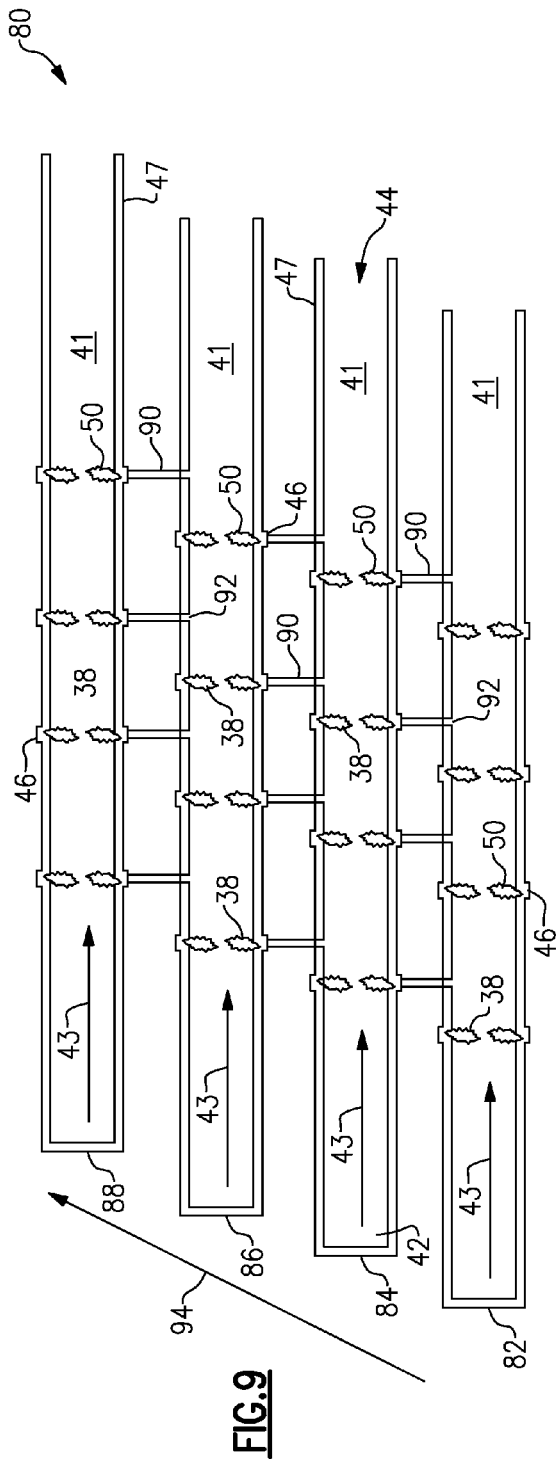
FIG. 9 is a schematic view illustrating an improved pulse detonation combustor including fluidic initiation obstacles for deflagration-to-detonation transition enhancement in accordance with exemplary embodiments.

Illustrated in FIG. 9 is a multi-tube crossfire pulse detonation engine, including a plurality of pulse detonation combustors, generally depicted as 80, each similar to the pulse detonation combustor 14 of FIGS. 1 and 2. More specifically included in engine 80 are a plurality of pulse detonation combustors 14, including a first pulse detonation combustor 82, a second pulse detonation combustor 84, a third pulse detonation combustor 86 and a fourth pulse detonation combustor 88. It should be understood that while four pulse detonation combustors are illustrated in FIG. 9, any number of combustors, fewer or greater than what is illustrated, may be utilized depending on engine specifications.

In the multi-tube crossfire configuration of FIG. 9, each of the pulse detonation combustors 82, 84, 86 and 88 are configured generally similar to any of the embodiments previously disclosed, each including an inlet 42 and an outlet 44, through which a fluid flows from upstream towards downstream, as indicated by the directional arrows 43. Each of the pulse detonation combustors 82, 84, 86 and 88 may further include proximate the inlet 42 of each pulse detonation chamber 41, an air intake valve (not shown), such as that depicted in FIG. 3. Each of the pulse detonation combustors 82, 84, 86 and 88 further include a plurality of aerodynamic jets 46 in communication with a plurality of openings 45 formed in the combustor sidewalls 47, adapted for communicating fluid flows from each of the plurality of aerodynamic jets 46 to the detonation chamber 41 as the jet flows 38, and thereby creating the plurality of initiation obstacles 50.

In this exemplary embodiment, the plurality of combustors 82, 84, 86 and 88 are configured in fluidic communication via a plurality of cross-tubes 90. Each of the detonation chamber sidewalls 47 further includes a plurality of openings 92, each coupled to one of the plurality of cross-tubes 90, adapted for communicating a pressure pulse created in one of the pulse detonation combustors 82, 84, 86, 88 to create a jet flow 38 in an adjacent combustor tube to drive the detonation process. More specifically, during operation, a pressure pulse created in the first pulse detonation combustor 82 would fire through the cross-tubes 90 coupling the first pulse detonation combustor 82, to the second pulse detonation combustor 84, to create a jet flow 38 within the second pulse detonation combustor 84, and a plurality of initiation obstacles 50. The firing of the pressure pulse created in each of the pulse detonation combustors progresses sequentially as indicated by directional arrow 94. In the configuration illustrated in FIG. 9, a fixed sequential firing rate is created for all the combustors 82, 84, 86 and 88, but an overall engine frequency could be changed by modifying the firing frequency of the first detonation chamber 82. The integration of the cross-tubes 90 into a multi-tube engine, such as engine 80, minimizes the amount of additional hardware required to make the engine functional.

Figure 10:
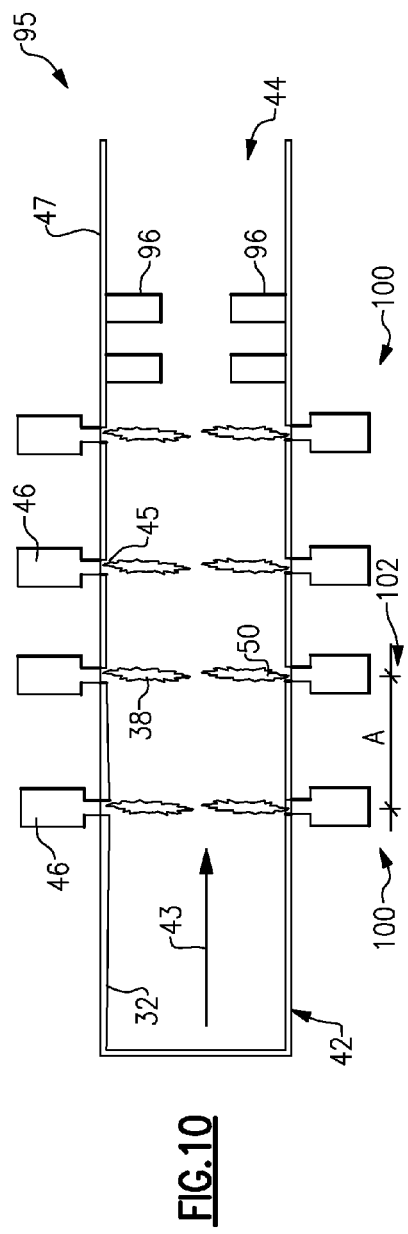
FIG. 10 is a schematic view illustrating an improved pulse detonation combustor including fluidic initiation obstacles for deflagration-to-detonation transition enhancement in accordance with exemplary embodiments.

As previously described, the embodiments depicted in FIGS. 3-9, integrate a plurality of aerodynamic jets 46 disposed adjacent an exterior of the detonation chamber 41, each configured to produce a jet flow 38 into the detonation chamber 41, thereby forming the plurality of initiation obstacles 50 during the combustion cycle. The plurality of initiation obstacles 50 are not present in the detonation chamber flow path 43 during the fill cycle, thereby minimizing pressure drops. Referring now to FIG. 10, illustrated is an alternate embodiment of an improved pulse detonation combustor, generally depicted as 95, and similar to pulse detonation combustors previously described with reference to FIGS. 3-9. In this exemplary embodiment, and in contrast to the previously disclosed embodiments, the pulse detonation combustor 95 includes a plurality of fixed initiation obstacles 96, in the form of shaped walls or traditional fixed structures that are present within the detonation chamber 41 during the fill cycle and the combustion cycle. The inclusion of the fixed initiation obstacles 96 is in addition to the jet flows 38 that are present during the combustion cycle as previously described. It has been shown both experimentally and numerically that a flame that is accelerated to the choked flow condition may require an additional influence that will "trip" the flame front and cause DDT to occur. The inclusion of the fixed initiation obstacles 96 in the pulse detonation combustor 95 provides a tripping point to the flow 43 in the event the shockwave may be strong enough at one point to blow the aerodynamic jets 46 "OFF", therefore causing them to not be capable of tripping a DDT occurrence.

In each of the embodiments illustrated in FIGS. 3-10, the plurality of aerodynamic jets 46 and resulting jet flows 38, and more particularly the initiation obstacles 50 they generate during the combustion cycle, may be configured as depicted and disposed in any number of rows and columns. More specifically, the columns may be spaced axially along the improved pulse detonation chamber 41, and the rows may be spaced circumferentially along the improved pulse detonation chamber 41. Additionally, the number of rows and columns and the spacing between each may be varied to achieve detonations or quasi-detonations in varying fuel-air systems. In other exemplary embodiments, the plurality of aerodynamic jets 46 and resulting jet flows 38, and more particularly the initiation obstacles 50 they generate during the combustion cycle, may be disposed in a number of rows and columns and having staggered or inline arrangement along the axial direction. In further exemplary embodiments, the plurality of aerodynamic jets 46 and resulting jet flows 38, and more particularly the initiation obstacles 50 they generate during the combustion cycle, may have varying density. In the exemplary embodiments illustrated in FIGS. 3-10, the plurality of aerodynamic jets 46 and resulting jet flows 38, and more particularly the initiation obstacles 50 they generate during the combustion cycle, are disposed in one or more circumferential arrays 100 (FIG. 10) wherein each circumferential array 100 is axially spaced as indicated at "A", relative to another circumferential array 100, along at least a portion of the detonation chamber 41 from the inlet 42 to the outlet 44. The plurality of aerodynamic jets 46 and resulting jet flows 38, and more particularly the initiation obstacles 50 they generate during the combustion cycle, may have various possible configurations within the pulse detonation chamber 41, further including odd as well as even numbers thereof; unequal as well as equal circumferential spacing; and unequal as well as equal size, geometry, and position of the plurality of aerodynamic jets 46 and resulting jet flows 38, and more particularly the initiation obstacles 50 they generate during the combustion cycle, of the pulse detonation chamber 41 as desired to enhance deflagration-to-detonation transition (DDT).

Referring still to FIGS. 3-10, the plurality of aerodynamic jets 46 and resulting jet flows 38, and more particularly the initiation obstacles 50 they generate during the combustion cycle, may be disposed in a wide variety of arrangements on the inner surface 32 of the pulse detonation chamber 41, between the inlet 42 and the outlet 44. In the exemplary embodiments, the plurality of aerodynamic jets 46 and resulting jet flows 38, and more particularly the initiation obstacles 50 they generate during the combustion cycle, are arranged in corresponding rows in the pulse detonation chamber 41 in single planes along a length of the pulse detonation chamber 41.

Accordingly, by the inclusion of a plurality of aerodynamic jets adapted to introduce a plurality of jet flows into the detonation chamber during a combustion cycle, wherein each of the plurality of jet flows creates an initiation obstacle on an interior of the detonation chamber between the inlet and the outlet provides: (i) minimization of pressure drops during the fill process; (ii) significant enhancement in the turbulence of the fluid flow within the detonation chamber during the combustion cycle; (iii) enhancement of the deflagration-to-detonation transition; and (v) an increase in the efficiency of the combustion system. The plurality of aerodynamic jets and resulting jet flows, and more particularly the initiation obstacles they generate during the combustion cycle, may have various configurations represented by various permutations of the various features described above as examples.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A detonation chamber for a pulse detonation combustor comprising:
    a plurality of aerodynamic jets disposed adjacent an exterior of a sidewall of the detonation chamber; and
    a plurality of openings formed in the sidewall of the detonation chamber, wherein each of the plurality of openings is in fluidic communication with one of the plurality of aerodynamic jets;
    wherein the plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

2. The detonation chamber of claim 1, wherein the plurality of aerodynamic jets are configured angled upstream to create the plurality of jet flows in a counter flow relationship to a flow of fluid through the combustion chamber.

3. The detonation chamber of claim 1, wherein the plurality of aerodynamic jets are configured angled downstream to create the plurality of jet flows in a flow relationship to a flow of fluid through the combustion chamber.

4. The detonation chamber of claim 1, wherein the plurality of aerodynamic jets are configured cross stream to create the plurality of jet flows in a cross stream relationship to a flow of fluid through the combustion chamber.

5. The detonation chamber of claim 1, wherein each of the plurality of aerodynamic jets is configured in fluidic communication with a source of fluid.

6. The detonation chamber of claim 5, wherein the source of fluid is a fuel.

7. The detonation chamber of claim 5, wherein the source of fluid is air.

8. The detonation chamber of claim 5, wherein the source of fluid is a mixture of fuel and air.

9. The detonation chamber of claim 5, wherein each of the plurality of aerodynamic jets is configured in fluidic communication with an external source of fluid via at least one connection line.

10. The detonation chamber of claim 9, wherein the plurality of aerodynamic jets are coupled to an external source of fluid via a plurality of individually addressable connection lines.

11. The detonation chamber of claim 5, wherein the plurality of aerodynamic jets are adapted to draw in a fluid from within the detonation chamber.

12. The detonation chamber of claim 1, further including a pulse detonation actuator (PDA) disposed adjacent the detonation chamber sidewall and adapted to impulsively detonate a flow of fluid to produce the plurality of jet flows.

13. The detonation chamber of claim 1, further including a plurality of fixed initiation obstacles present within the detonation chamber during a combustion cycle and a fill cycle to enhance a turbulence of a fluid flow and flame acceleration through the detonation chamber.

14. The detonation chamber of claim 1, wherein said plurality of aerodynamic jets are circumferential spaced apart along at least a portion of the detonation chamber.

15. The detonation chamber of claim 13, wherein said circumferential spaced apart plurality of aerodynamic jets are disposed in one or more circumferential arrays axially spaced along at least a portion of the detonation chamber.

16. A detonation chamber for a pulse detonation combustor comprising:
- a plurality of aerodynamic jets disposed adjacent an exterior of a sidewall of the detonation chamber;
- an inlet and an outlet, wherein the plurality of aerodynamic jets are disposed between the inlet and the outlet; and
- a plurality of openings formed in the sidewall of the detonation chamber, wherein each of the plurality of openings is in fluidic communication with one of the plurality of aerodynamic jets;
- wherein the plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

17. The detonation chamber of claim 16, wherein the plurality of aerodynamic jets are configured angled upstream to create the plurality of jet flows in a counter flow relationship to a flow of fluid through the combustion chamber.

18. The detonation chamber of claim 16, wherein the plurality of aerodynamic jets are configured angled downstream to create the plurality of jet flows in a flow relationship to a flow of fluid through the combustion chamber.

19. The detonation chamber of claim 16, wherein the plurality of aerodynamic jets are configured cross stream to create the plurality of jet flows in a cross stream relationship to a flow of fluid through the combustion chamber.

20. The detonation chamber of claim 16, wherein each of the plurality of aerodynamic jets is configured in fluidic communication with a source of fluid.

21. The detonation chamber of claim 16, further including a pulse detonation actuator (PDA) disposed adjacent the detonation chamber sidewall and adapted to impulsively detonate a flow of fluid to produce the plurality of jet flows.

22. The detonation chamber of claim 16, further including a plurality of fixed initiation obstacles present within the detonation chamber during a combustion cycle and a fill cycle to enhance a turbulence of a fluid flow and flame acceleration through the detonation chamber.

23. The detonation chamber of claim 16, wherein the plurality of initiation obstacles are circumferentially and axial spaced apart between said inlet and said outlet.

24. A pulse detonation combustor comprising:
- at least one detonation chamber;
- an oxidizer supply section for feeding an oxidizer into the detonation chamber;
- a fuel supply section for feeding a fuel into the detonation chamber; and
- an igniter for igniting a mixture of the gas and the fuel in the detonation chamber,
- wherein said detonation chamber comprises:
  - a plurality of aerodynamic jets disposed adjacent an exterior of a sidewall of the detonation chamber; and
  - a plurality of openings formed in the sidewall of the detonation chamber, wherein each of the plurality of openings is in fluidic communication with one of the plurality of aerodynamic jets;
  - wherein the plurality of aerodynamic jets are adapted to create a plurality of jet flows of a fluid within the detonation chamber during a combustion cycle defining a plurality of initiation obstacles within the detonation chamber to enhance a turbulence of a fluid flow and flame acceleration through the detonation chamber.

25. The pulse detonation combustor of claim 24, further comprising a plurality of detonation chambers interconnected by a plurality of cross-tubes to create a fixed sequential firing rate of the plurality of jet flows of a fluid within the plurality of detonation chambers.

26. The pulse detonation combustor of claim 24, wherein the detonation chamber further comprises an inlet and an outlet, wherein the plurality of initiation obstacles are disposed between the inlet and the outlet.

27. The pulse detonation combustor of claim 24, wherein the plurality of initiation obstacles are circumferentially and axial spaced apart between said inlet and said outlet.

\* \* \* \* \*